United States Patent [19]

Mueller

[11] Patent Number: 4,691,835

[45] Date of Patent: Sep. 8, 1987

[54] TAMPER-EVIDENT SEALED CONTAINER AND TAMPER-EVIDENT TUBE AND BANDS AND APPARATUS AND METHOD OF MAKING AND USING SAME

[76] Inventor: Martin L. Mueller, 4929 East Lake Shore Dr., Wonder Lake, Ill. 60097

[21] Appl. No.: 827,208

[22] Filed: Feb. 4, 1986

Related U.S. Application Data

[63] Continuation of Ser. No. 451,401, Dec. 20, 1982, abandoned.

[51] Int. Cl.⁴ .................. B65D 55/02; B65B 13/02
[52] U.S. Cl. ................................ 215/246; 53/442; 53/291; 53/296; 53/399; 53/557; 53/582
[58] Field of Search ............... 53/291, 128, 293, 557, 53/298, 585, 292, 296, 581, 582, 399, 442; 156/193, 195, 86; 215/246; 493/288, 290, 299, 301; 206/497

[56] References Cited

U.S. PATENT DOCUMENTS

| | | | |
|---|---|---|---|
| 2,141,722 | 12/1938 | Morgan | 215/246 X |
| 2,393,347 | 10/1940 | Stuart et al. | |
| 2,802,513 | 8/1957 | Stoechel et al. | 156/193 X |
| 2,917,217 | 12/1959 | Sisson | 493/299 X |
| 3,037,529 | 6/1962 | Hancik | |
| 3,139,011 | 6/1964 | Glasby | |
| 3,294,609 | 12/1966 | Foll | |
| 3,400,029 | 9/1968 | Mesrobian et al. | 493/301 X |
| 3,412,524 | 11/1968 | Nestell et al. | 53/557 X |
| 3,420,722 | 1/1969 | McNulty et al. | 138/144 X |
| 3,746,201 | 7/1973 | Fujio | 215/246 |
| 3,827,591 | 8/1974 | Spelman et al. | 215/246 |
| 3,854,583 | 12/1974 | Amberg et al. | 206/520 |
| 3,880,688 | 4/1975 | Colori et al. | 156/193 X |
| 3,960,624 | 6/1976 | Erlandson | 156/69 |
| 3,969,173 | 7/1976 | Amberg et al. | 156/218 |
| 4,001,065 | 1/1977 | Penneck | |
| 4,004,705 | 1/1977 | Fujio | 215/246 |
| 4,065,909 | 1/1978 | Mueller | 53/128 X |
| 4,133,924 | 1/1979 | Seino et al. | 215/246 X |
| 4,151,024 | 4/1979 | Ohlsson | |
| 4,215,460 | 8/1980 | Amberg et al. | 156/86 X |
| 4,238,267 | 12/1980 | Konstantin | 215/246 X |
| 4,356,046 | 10/1982 | Yamazaki | |
| 4,385,480 | 5/1983 | Burchette, Jr. | 493/289 X |
| 4,387,553 | 6/1983 | Strub et al. | 53/585 |
| 4,501,948 | 2/1985 | Yampolsky et al. | |

OTHER PUBLICATIONS

Guschky & Tönnesmann KG, West Germany; Brochure on Tube Winding Equipment and Techniques; 18 pages.

Primary Examiner—Robert L. Spruill
Assistant Examiner—Steven P. Weihrouch
Attorney, Agent, or Firm—Dressler, Goldsmith, Shore, Sutker & Milnamow, Ltd.

[57] ABSTRACT

A method and apparatus are disclosed for formation of a spirally-wound, heat-shrinkable tube from which a great multiplicity of tamper-evident bands can be cut for subsequent heat-shrinkable application to containers. A strip of strinkable material oriented primarily in the direction of its length is spirally-wound to form the tube from which the bands are severed, with heat-shrinkability of the tube and bands being primarily in a radial direction. The radial heat-shrinkability of the tube and bands assures proper heat-shrink fitment of the bands to associated containers for tamper indication, with the spirally-wound formation of the tube facilitating very economical fabrication of the tamper-evident bands.

3 Claims, 4 Drawing Figures

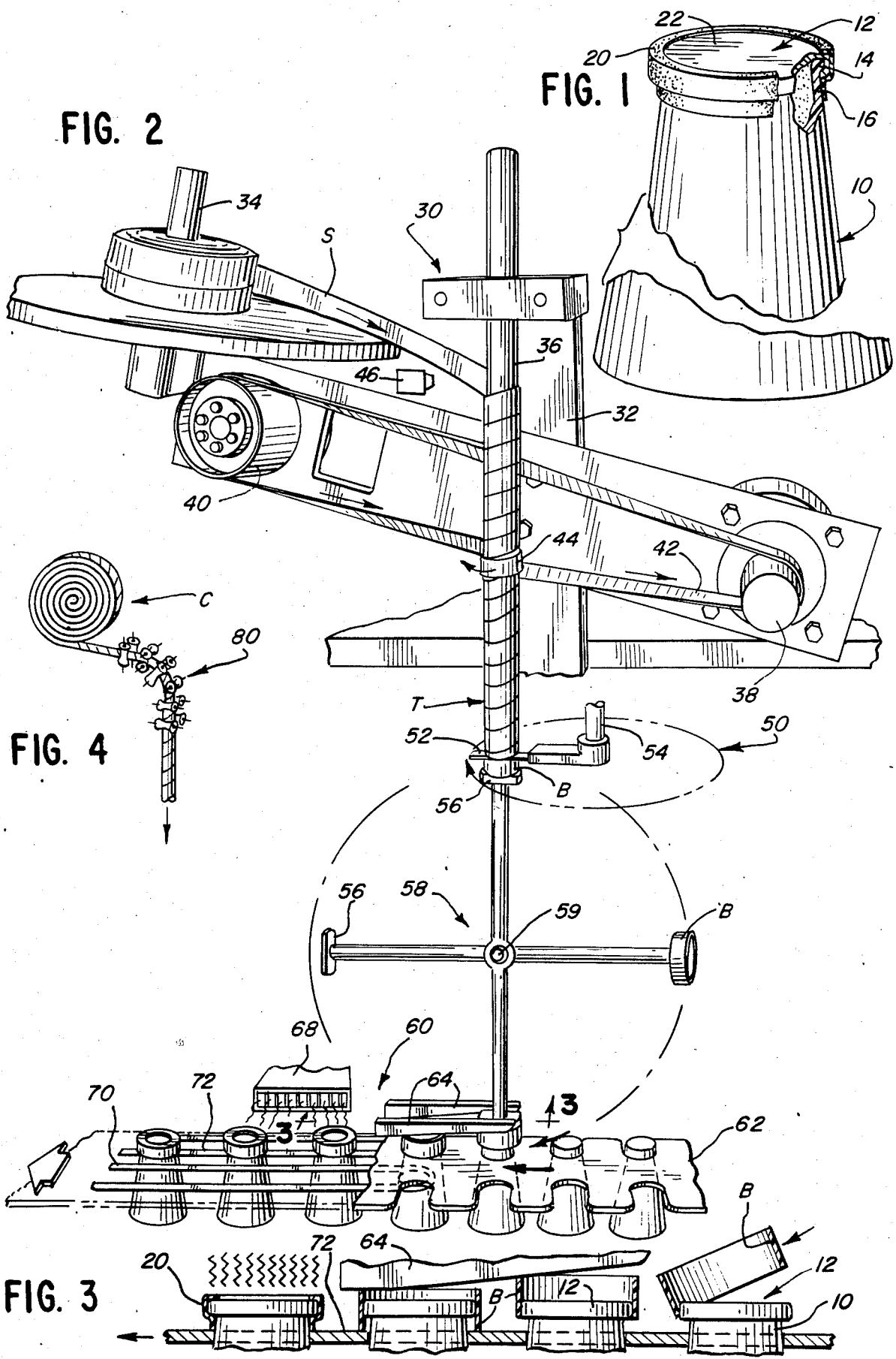

TAMPER-EVIDENT SEALED CONTAINER AND TAMPER-EVIDENT TUBE AND BANDS AND APPARATUS AND METHOD OF MAKING AND USING SAME

This application is a continuation of application Ser. No. 451,401, filed Dec. 20, 1982, now abandoned.

BACKGROUND OF THE INVENTION

A wide variety of tamper-evident seals have been developed for sealing containers of many types. Many of them utilize relatively expensive materials, and the processes required to make them, and then to affix them to containers in their tamper-evident relationships are expensive. It is with an improved tamper-evident seal and method of making same, and with an expeditious method and apparatus for forming and applying such improved seals, with which the present invention is concerned.

Typically the materials from which one class of tamper-evident seals are made are shrinkable plastic materials, most commonly heat-shrinkable materials. Generally the object so to be sealed is a container having a closure associated with the top portion of the container which may comprise a neck and mouth thereof. Although cork-type closures in container mouths are sometimes so sealed, most such containers utilize closures which are screw-threaded or snapped over the container mouth, thereby to close the top of the container. An effective tamper-evident seal is one which embraces the closure, which envelopes a top peripheral portion of the closure, and which also grippingly embraces the portion of the container immediately below the closure, such as a neck portion of the container. The seal should be of such a material which, when access to the container has been gained, will either have been destroyed or will not readily be reaffixable to the container, thereby to make it evident to a purchaser that the container has been opened, i.e., tampered with.

Plastic materials of different types have been used for this purpose. Indeed, seals of other materials such as lead seals, have been used, such as with wine bottles for this purpose. Usually, when plastic materials are used, tubular bands are formed and are placed over the closure and container in the zones of securance, and the bands are shrunk in place. Shrinking processes most frequently employ heat which requires that the band be shrinkable inwardly, thereby readily to grip the closure and the adjacent container portions. To facilitate shrinking, the tube must be processed to have a shrinking characteristic. Although some materials may be swollen for subsequent heat-shrinking, most commonly the band to be shrunk is formed of an oriented plastic material which, when heat is applied, will shrink primarily in the direction of orientation, i.e, in the radial direction and inwardly of the closure and container portion it is to embrace.

One of the most broadly used processes for so orienting heat-shrinkable materials is to produce sheets or strips and, during their formation, to orient such sheets or strips so that they have a substantial degree of orientation (hence heat shrinkability later) in the machine direction. Such strips or sheet materials may be printed or otherwise decorated. They are usually severed into segments of predetermined rectangular dimensions. The segments are then formed into bands, as by overlapping and adhering marginal edges, and such a band is then applied to a container and closure, and shrunk to form a tamper-evident seal.

In such a process, the direction in which the plastic material is shrinkable is in the direction in which it was formed. If a tube were to be formed continuously in that direction, and segments of the tube removed, the resulting segments or bands would not heat shrink primarily inwardly of the container and closure, i.e., primarily radially but rather would shrink longitudinally. As such, bands formed from the formed, oriented plastic sheet material have become useful as tamper-evident seals only when segments are first cut from the sheet or strips, and the segments are then formed into tubular bands individually.

Other processes have also been used for making tamper-evident bands, but none has combined both ease of formation of the seal and ease of application of the seal in a simple, inexpensive and, when desired, continuous process.

SUMMARY OF THE INVENTION

In accordance with the present invention, there is provided an improved tamper-evident seal. The seal is formed from a shrinkable tubular band adapted to embrace and grip a closure and an adjacent portion of a container to which the closure is secured. The bands are made by spiral winding an elongated continuous strip of plastic material oriented and shrinkable primarily in the direction of its length to form a continuous tube, and severing spiral wound lengths from the tube to provide individual shrinkable tubular bands, each band being shrinkable primarily in the radial direction. Desirably, the strip is wound continuously to form an endless continuous tube, from which spiral wound lengths are repeatedly severed to provide a great multiplicity of individual shrinkable bands from a single tube. The angle of intersection of the primary direction of orientation of the spiral wound tube with a plane perpendicular to the axis of the tube is preferably no more than about 35 degrees. In the preferred form, the strip is a strip of relatively brittle expanded plastic material.

To provide tamper-evident seals on an array of containers, each having a closure, the method of this invention contemplates providing a spiral wound plastic shrinkable tube formed from a strip oriented primarily in the direction of its length and shrinkable primarily in the direction of its length and being wound and joined along its edges, the tube being shrinkable primarily in the radial direction, thereafter severing a tubular length from the tube to provide a tubular band, thereafter applying the tubular band to a container to surround the closure and an adjacent portion of the container, and then shrinking the band to embrace the closure and grip the adjacent container portion. The steps are repeated continuously to seal an array of containers. Shrinking preferably comprises heat shrinking.

This invention also contemplates apparatus for providing tamper-evident seals on an array of containers, each having a closure. The apparatus includes means for providing a spiral wound plastic shrinkable tube formed from a strip oriented primarily in the direction of its length and shrinkable primarily in the direction of its length and being wound and joined along its edges, the tube being shrinkable primarily in the radial direction, means for severing a tubular length from the tube to provide a tubular band, means for applying the tubular band to a container to surround the closure and an adjacent portion of the container, and means for shrinking said band to embrace the closure and grip the adjacent container portion. The spiral wound orientation is at an angle of no more than about 35 degrees to the central axis of the portion of the container below the closure, and in its preferred form, the seal is of a relatively brittle, expanded foam material.

The practice of the methods and apparatus of this invention are intended to produce a sealed container having an openable top closed by a closure, and sealed by a tamper-evident seal, the seal embracing the side of the closure, overlying at least a top peripheral portion of the closure and gripping a portion of the container below the closure, and in which the seal comprises a band of spiral wound plastic material which is heat shrunk in the sealing position and which remains oriented primarily in the direction of its spiral wound orientation.

Further objects, features and advantages of the present invention will become apparent from the following description and drawings of a presently preferred embodiment.

BRIEF DESCRIPTION OF THE DRAWINGS

FIG. 1 is a perspective view of a typical container which has been provided with a tamper-evident seal of the present invention;

FIG. 2 is a schematic perspective view of a machine for continuously forming, transferring and applying heat-shrinkable bands to containers to provide seals of the type shown in FIG. 1;

FIG. 3 is a view taken substantially along line 3—3 of FIG. 2 showing how the heat-shrinkable bands may be continuously applied to containers and shrunk to produce sealed containers of FIG. 1; and FIG. 4 is a view showing how a coiled, preformed spiral wound, shrinkable tube may be used to provide shrinkable bands.

Referring first to FIG. 1, a container 10 is shown as having a closure 12. Closure 12 may be suitably secured to the container as by screw-threading or, as shown, may be snap-fitted to the container, thereby to sealingly close the container mouth 14. The container 10 terminates upwardly in a shoulder portion 16 below mouth 14 and the closure 12.

Tamper-evident seal 20 is seen to embrace the closure periphery, to overlie a marginal portion of the closure top 22 and to grippingly embrace container 10 in the zone of portion 16. The material of which seal 20 is made is so that it closely grips and embraces the closure and container such that when the closure is to be removed to gain access to the container, the seal must either be torn, cut or otherwise be removed or destroyed, or the seal, if removed intact with the closure, will be virtually impossible to re-position over the mouth 14 and container portion 16. Thus, once the closure has been removed, its reaffixation must be either without the seal or with a seal which will have been cut or torn, all of which "facts" will make it evident to a subsequent purchaser or user that someone has removed the closure and has had the opportunity to gain access to and tamper with the container contents. This, of course, is the purpose of a tamper-evident seal and the prior art is replete with seals meeting these general requirements.

Referring now to FIG. 2, the process and machine of the present invention is shown to include a spiral winding machine 30. Machine 30 comprises support framing 32, a strip supply reel 34, a winding mandrel 36, a motor driven winding drum 38, an idler drum 40, and a winding belt 42. As seen, as the winding belt 42 is driven in the direction shown, its wrapped section 44 drives the spiral tube T around the mandrel 36, and may both uncoil the elongated continuous plastic strip S to continue the formation of the continuous spiral wound tube T, and to drive the tube T downwardly. The spiral winding machine 30 may be of a generally conventional type known for use in forming toilet paper rolls, frozen juice cans, and a host of other spirally wound tubular products presently available for domestic and industrial uses.

In accordance with the preferred embodiment of this invention, the strip S is formed from a web of polystyrene foam or expanded polystyrene material having a thickness of from about 0.002 inch to about 0.004 inch, it being desired to use the thinnest possible material for speed of shrinkage and economy.

While, as noted above, it is preferred to use relatively thin gauge material, the present invention also contemplates that substantially thicker materials can be used in the range, for example, of from about 0.020 inch to about 0.040 inch. Such thicker materials may have a density on the order of 10 to 30 pounds per cubic foot, and while heat-shrinkable expanded polystyrene is a preferred material, other heat-shrinkable expanded thermoplastic materials, such as polypropylene, polyethylene, and polyvinyl chloride are also appropriate for use in the present invention.

When used as a tamper-evident seal, the material is relatively brittle, and fragile, so that when it is bent, it breaks, and when efforts to remove it, as with fingernails, are attempted it is fractured at the point of attack to provide visual evidence of tampering. The strip S may be about one inch wide and may have a substantial degree of orientation and shrinkability in the longitudinal direction of the strip.

The strip is oriented primarily in the direction of its length and is therefore shrinkable primarily in that direction. It is not necessary that there be shrinkability in the other direction (perpendicular to the machine direction), but some shrinkability in that direction is permissible.

The strip S may be printed with textual or decorative material, or both, and in a pattern which will compensate, after shrinking, for the shrinking to provide the desired image and proportioning of text and design, all as is known and understood in the art. The strip S may also be joined or laminated with other materials to provide suitable decorative or functional finishes, the only requirement being that such other materials not interfere with the shrinking and sealing of the strip S.

As the longitudinally oriented strip is uncoiled and drawn from supply reel 34, it passes an adhesive applying station 46. The adhesive is applied, as by spray heads in a known manner, to the marginal edge of the strip so that when the strip is wound, as by overlapping, with the preceeding turn of the strip on the mandrel, the adhesive will cause the overlapped portions to adhere, thus to form the integrated continuous tube T. Although adhesive may be used to integrate the tube, depending upon the plastic of which strip S is formed and its properties, solvents may be used to facilitate bonding. Under properly controlled circumstances, heat softening may also be utilized to bond overlapped portions of the strip, thereby to form a integrated tube T which is shrinkable primarily in the radial direction.

Preferably, the overlap is as little as reasonably possible. With the polystyrene material described, an overlap of as little as 1/16" may be used, although an overlap of about ⅛ inch, 3/16 inch or even slightly more may be used as well.

As stated, belt 42 drives the tube T continuously downwardly. The width of the belt 42 is preferably slightly less than the width of the strip S. As the tube T grows in length, i.e., moves downwardly, it reaches a severing and transferring station 50 at which lengths comprising individual tubular bands B are continuously severed therefrom by a suitable cutter, such as a knife 52 mounted for rotation about shaft 54. Although the cutter is shown as operating externally of the tube T, internal cutters may be used as well. Because tube T is heat-shrinkable primarily in the radial direction, each band B is also heat-shrinkable primarily radially. Substantially simultaneously with its severance from tube T, band B may be seated on a transfer applicator 56 which is mounted on a rotatable transfer turret 58. Turret 58 then carries bands B about shaft 59 to the sealing station 60.

Filled containers 10 having associated affixed closures 12 are continuously supplied to sealing station 60. For that purpose container carriers 62, which are configured suitably for the particular containers, convey and guide suitably filled containers to the supply station. Of course appropriate closures are in place on the containers. As each container enters the sealing station (as shown by FIGS. 2 and 3), a transfer applicator carrying a band B moves synchronously to engage a band B with a container 10, for example, by bringing the leading edge of the band B into engagement with the leading edge of the container closure (see FIG. 3). Camming guides 64 then engage a band B in zones adjacent the side edges of the transfer applicator 56, and cam and guide the band B downwardly, both out of engagement with the transfer applicator 56 and to the appropriate, pre-determined elevation relative to the container and closure. Of course, the band is preferably only slightly larger in diameter than the external diameter of the closure so that it will remain at the selected elevation. If it will not, suitable elevation maintainance guides or stops may be provided in association with the container carriers or otherwise.

As the containers with bands B continue to move (to the left), a source of heat, such as heat tubes 68, direct heat against the bands B. Because the molecular orientation of the bands is such that the bands will shrink in the longitudinal direction of the original strip (radially of the formed bands B), they quickly shrink about the closure to embrace and grip the closure, thereby also to overlie a peripheral portion of the top of the closure 12 and to grip the portion 16 of the container 12 immediately below the closure, all as illustrated in FIG. 3. Preferably the containers 10 are rotated as the heat is applied. That may be facilitated by providing a driven belt 70 which engages the containers and which biases it against a guide bar 72.

While bands B have been illustrated and described as embracing only the peripheral portion of the closure 12, the present invention also contemplates that the entire top surface of the closure may be covered With such an arrangement, the band will have an axial dimension greater than that illustrated in FIG. 3, so that upon heating the top edge of the band will shrink together to form a continuum of thermoplastic material. If it is desired to have a completely smooth thermoplastic layer, a heated platen having a flat surface may be applied to the thermoplastic continuum to smooth out any wrinkles therein.

Carriers 62, as shown, are capable of carrying a double row of containers through the sealing station. Tandem forming, winding, transferring and applying mechanisms thus may be used if desired.

It will be apparent to those skilled in the art that the particular mechanisms disclosed may be varied substantially. As such, the specific winding machine, disclosed the severing device, the band transfer mechanism, and the means for applying the transferred bands to the containers (as well as the type of shrinking mechanism, which could be resistance heating rods or the like) are not in and of themselves individually critical to the practice of the present invention. They do, in combination, however make it possible continuously and easily to form heat-shrinkable bands which may be continuously applied to containers, all at minimum expense compared especially to seals of like material which are individually formed from individual rectangular blanks of material.

The dimensions of the bands will, of course, vary with the container and closure to be sealed. Thus, bands B can be formed in diameters as small as ½ or ¾ inch, and as large as six inches or more. For most medical applications (such as for bottles of capsules) they will range from one-half to less than two inches in diameter. For food applications, they may range from about one to two inches, although in some food applications the diameters can run as much as six inches or more.

It is, of course, important that the direction of orientation of the strip S be significantly retained in the tube T and severed bands B. Thus, the width of a strip S should be such that when it is wound upon the mandrel, the machine direction (the direction in which the strip has been primarily oriented), should be at an angle of no more than about 35° to a plane perpendicular to the axis of the tube T.

That is to say that the strip S is wound such that the angle of intersection of the primary direction of orientation of the strip (which is usually parallel to the edge of the strip) with a plane perpendicular to the axis of the tube is no more than about 35 degrees. Thus, the smaller the diameter of the band to be formed, the narrower the strip S which may permissibly be used. The greater the diameter of the band to be formed, the greater the permissible width of the strip S. However, if the strip is provided with some degree of heat-shrinkability in the direction perpendicular to the machine direction, i.e., is partially biaxially oriented, the angle at which the strip S is inclined may be increased somewhat.

Thus, generally speaking, for band diameters substantially less than one inch in diameter, strips S of about one inch should be used to form the tube T. For bands of from about one inch to one and one-half inches in diameter, strip widths of about one inch to 1½ inches are most desirable, and for band diameters in excess of 1½ inches, strip widths of 2 inches or more will be most desirable. Of course, the formation of the tube will most inexpensively proceed with wider strips. However, for the reasons stated, this must be balanced with the needed shrink characteristics of the tubular bands severed from the continuously formed tube.

Although, as shown, it is most desirable to form the spiral tube continuously to provide a great multiplicity of individual shrinkable bands in conjunction with the operation of the filling and closure applying machines (not shown) from which the containers are conveyed by the container carriers to the sealing station, it is also within the purview of the present invention to form the spiral tube in another location, from which it is then brought to be severed into bands to be applied in synchronism with the presentation of containers to be sealed.

As such, it is contemplated by this invention also that a spiral wound tube T may be flattened and wound into a flattened coil C, with the coil C then being transported to the sealing machine with which it is to be used. The coil C is then cammed open (see FIG. 4), and may then be fed to a cutter and otherwise follow the same path as the bands formed, transferred and applied in the manner above described. As seen in FIG. 4, a coil of flattened spiral wound tube T, is cammed open by a cam means 80, following which it is ready to be presented to a knife 52 to be severed, and thence be transferred and used as described in connection with the embodiment of FIGS. 2 and 3.

Of course, whether a coil C is used, or the continuously formed tube T of FIGS. 2 and 3 is used, each will produce hundreds of tubular bands, each of which is at least ¼ inch in length. Continuous formation of the spiral wound tube T can produce tens of thousands of bands or more.

When polystyrene foam of the type described is used, because it tends towards brittleness, if it is to be flattened and then opened, it may be desirable to heat the tube T slightly in the zones in which the folds or creases are to be formed, thereby to assist in folding without cracking. Slight heating may be also be of advantage to assist in reopening the tube from its flattened coiled form. The heat level, however, should be controlled to minimize initiating of the shrinking of the coiled tube T.

The formation of the spiral wound heat-shrinkable tubes to provide shrinkable bands may be with materials other than the relatively brittle expanded polystyrene material described above. Thus other heat shrinkable expanded thermoplastic materials can be employed, including polypropylene, polyethylene and polyvinyl chloride which may be formed by conventional forming and orienting procedures into strips which are oriented to be shrunk in the direction of the length of the strip. Brittle material is preferred for anti-tampering purposes. Non-expanded, oriented plastic strips may be used as well in the practice of the present invention, and typical oriented, non-expanded, plastic materials include polyethylene, polypropylene and other known orientable materials.

The continuously formed spiral tube can provide thousands and tens of thousands of bands continuously and without the individual formation required for such bands in prior art machines. The strip S from which the tube is formed may be joined, as one coil comes to an end, with a strip of another coil so that the tube T may be formed for many hours and even days in one continuous length, from which bands are severed. When coils of tubes T are formed for use, the coil may produce tens of thousands of bands (hence seals), again without individual band formation and the expensive forming equipment required in prior art operations.

It will be apparent to those skilled in the art that modifications in the specific embodiments described may be made without departing from the spirit and scope of this invention. Accordingly, I do not intend to be limited to the embodiments described except insofar as may be made necessary by the appended claims.

What is claimed is:

1. A method of continuous making and applying a plurality of individual heat-shrinkable cylindrical tubular bands each adapted for subsequent heat-shrink application to a container, comprising the steps of:
   providing an elongated continuous strip entirely comprising heat-shrinkable, expanded polystyrene foam plastic material, wherein said plastic material is oriented and heat-shrinkable primarily in the direction of the length of said strip;
   providing a relatively fixed, cylindrical winding mandrel means having a free end;
   continuously advancing said strip onto said winding mandrel means at a portion thereof spaced from the free end of the mandrel means, said strip being advanced onto said mandrel means at an acute angle with respect to a plane perpendicular to the axis of said winding mandrel means to continuously spirally wind said continuous strip on and about winding mandrel means, including overlapping and joining edge portions of said continuous strip, to thereby continuously form a generally cylindrical spirally-wound heat-shrinkable tube of said plastic material which includes a spiral heat-shrinkable seam at said overlapping edge portions, said tube being advanced axially of said winding mandrel means toward said free end thereof, wherein said continuous strip is wound at said acute angle to provide an angle of intersection between said primary direction of orientation and a plane perpendicular to the axis of said tube such that said orientation and shrinkability of said strip primarily in the direction of its length results in said spirally-wound tube being primarily heat-shrinkable in a radial direction;
   continuously severing spirally-wound lengths from said tube to provide said individual heat-shrinkable tubular bands each in a generally cylindrical spirally-wound configuration wherein each said tubular band is primarily heat-shrinkable in a radial direction;
   positioning each said individual tubular band in respective association with one of a plurality of said containers; and
   heating said individual tubular bands whereby each said band is heat-shrunk primarily in the radial direction thereof to embrace the respective one of said containers.

2. The combination of a container having a heat-shrunk, spirally-wound tubular band thereon formed in accordance with the method of claim 1.

3. The method of making and applying heat-shrinkable tubular bands in accordance with claim 1, wherein each said tubular band is positioned and heat-shrunk relative to its respective container to embrace a closure of the container for tamper-indication upon partial or complete opening of the container by removal of the closure thereof.

* * * * *